United States Patent
Winger et al.

(10) Patent No.: US 8,036,271 B2
(45) Date of Patent: Oct. 11, 2011

(54) METHOD AND APPARATUS FOR DETERMINING A SECOND PICTURE FOR TEMPORAL DIRECT-MODE BLOCK PREDICTION

(75) Inventors: Lowell L. Winger, Waterloo (CA); Simon Booth, Milton (CA); Elliot N. Linzer, Suffern, NY (US); Ho-Ming Leung, Cupertino, CA (US)

(73) Assignee: LSI Corporation, Milpitas, CA (US)

( * ) Notice: Subject to any disclaimer, the term of this patent is extended or adjusted under 35 U.S.C. 154(b) by 1051 days.

(21) Appl. No.: 10/785,273

(22) Filed: Feb. 24, 2004

(65) Prior Publication Data
US 2005/0185713 A1    Aug. 25, 2005

(51) Int. Cl.
  *H04N 7/12*    (2006.01)
  *H04N 11/02*    (2006.01)
  *H04N 11/04*    (2006.01)
(52) U.S. Cl. ......... 375/240.16; 375/240.12; 375/240.13; 375/240.14; 375/240.15
(58) Field of Classification Search . 375/240.12–240.16
  See application file for complete search history.

(56) References Cited

U.S. PATENT DOCUMENTS

| | | | | |
|---|---|---|---|---|
| 2003/0206589 A1* | 11/2003 | Jeon | ........................ | 375/240.15 |
| 2004/0066848 A1* | 4/2004 | Jeon | ........................ | 375/240.15 |
| 2004/0136461 A1* | 7/2004 | Kondo et al. | ............ | 375/240.16 |
| 2004/0146109 A1* | 7/2004 | Kondo et al. | ............ | 375/240.16 |
| 2004/0179620 A1* | 9/2004 | Foo et al. | ................. | 375/240.27 |
| 2004/0234143 A1* | 11/2004 | Hagai et al. | .................. | 382/238 |
| 2005/0129120 A1* | 6/2005 | Jeon | ........................ | 375/240.15 |
| 2007/0014359 A1* | 1/2007 | Gomila et al. | ............ | 375/240.16 |

OTHER PUBLICATIONS

"Method and/or Apparatus for Video Data Storage", Linzer et al., LSI Logic Corporation, filed Nov. 27, 2002, U.S. Appl. No. 10/306,751.
"Method and/or Apparatus for Determining Minimum Positive Reference Indices for a Direct Prediction Mode", Winger, LSI Logic Corporation, filed Jun. 13, 2003, U.S. Appl. No. 10/461,780.

* cited by examiner

*Primary Examiner* — Christopher S Kelley
*Assistant Examiner* — Chikaodili Anyikire
(74) *Attorney, Agent, or Firm* — Christopher P. Maiorana, PC

(57) ABSTRACT

A method for determining a first and a second reference picture used for inter-prediction of a macroblock, comprising the steps of (A) finding a co-located picture and block, (B) determining a reference index, (C) mapping the reference index to a lowest valued reference index in a current reference list and (D) using the reference index to determine the second reference picture.

20 Claims, 3 Drawing Sheets

METHOD AND APPARATUS FOR DETERMINING A SECOND PICTURE FOR TEMPORAL DIRECT-MODE BLOCK PREDICTION

FIELD OF THE INVENTION

The present invention relates to video generally and, more particularly, to a method and apparatus for determining a second picture for temporal direct-mode block prediction.

BACKGROUND OF THE INVENTION

The H.264/MPEG4-AVC video standard allows multiple different reference pictures for inter-prediction. The different reference pictures are potentially signaled down to 8×8 partitions which reference a picture to use for inter-prediction. The standard also allows the choice, in a flexible manner, of which reference pictures to use, and the order in which the reference pictures, are available for any given slice (i.e., a group of macroblocks) of video.

Such flexibility leaves the direct (i.e., spatial and temporal) block prediction modes open to a wide variety of different implementations. A direct-mode block is a bi-predictive predicted block in a B-frame that does not signal either references or motion vectors. Rather, references and motion vectors are derived from a co-located block in a previously decoded picture. The overhead of the derived block mode is very low and provides a very important prediction mode that is often used to significantly reduce the rate of B-frames.

The reference pictures for each slice of video are arranged into two ordered lists (i.e., List0 and List1). For bi-predictive and direct-mode predicted blocks, one picture from each list should be indicated for use for inter-prediction by two reference-indices (one into each list) indicating an ordered number of one of the reference pictures from each list.

Previous H.264 implementations of direct-modes use the following sequence to determine which two current reference pictures should be used for inter-prediction of each block of direct-mode block. First, previous H.264 implementations find the co-located picture (i.e., reference 0, the first reference picture from List1) and block for the current block. This co-located picture will be the first reference picture used for direct-mode prediction. Next, the co-located block will be used to derive the reference indices and motion vectors for the current block. Specifically, previous H.264 implementations determine the List0 reference picture that is used by the co-located block to refer to a 'direct-mode reference'. The reference index in the co-located picture of this direct mode reference is called the direct-mode reference index. The direct mode reference index is used by the current block to determine the second reference picture to use for inter prediction. Specifically, the direct-mode reference index is directly used in the reference picture list of the current slice. Finally, the motion vectors for the current block are interpolated from the motion vectors used in the co-located block according to the temporal distances between the current picture and the two reference pictures.

Such an implementation has the disadvantage that the second reference picture does not necessarily refer to the same physical reference picture for direct-prediction that was used for inter-prediction by the co-located block. The reference picture used in the co-located block and the second picture used in the direct-mode prediction of the current block are the same physical picture only if the direct mode reference picture was present in the same position (i) in List0 of the current slice of the current picture being decoded and (ii) in List0 of the co-located slice of the co-located picture.

The intent of direct-mode prediction is that it uses the physical reference picture used by the co-located block as a reference picture for the current block. However, since H.264 supports reference picture re-ordering, this condition is not necessarily met. Reference picture re-ordering is the ability to flexibly order reference lists for each slice to use different pictures that are best inter-predicted from various other previously encoded/decoded pictures. If the encoder has the ability to specify which pictures are best for the current picture, then prediction residuals may be reduced.

A particular example of where the ability to re-order reference pictures is useful is to adaptively choose whether to code an I or P-picture as two fields (the second of which is inter-predicted from the first) or as a single picture without inter-prediction between fields. The reference pictures may be re-ordered between the current picture and the co-located picture such that the same reference picture does not occur in the same position in the respective List0. The direct-mode prediction could be seriously compromised with the existing solution since the intended use of the direct-mode is that the same reference picture would be used.

It would be desirable to identify reference index that spatial and temporal direct-mode prediction modes should use to reference the picture that was the primary reference of the co-located macroblock.

SUMMARY OF THE INVENTION

The present invention concerns a method for determining a first and a second reference picture used for inter-prediction of a macroblock, comprising the steps of (A) finding a co-located picture and block, (B) determining a reference index, (C) mapping the reference index to a lowest valued reference index in a current reference list and (D) using the reference index to determine the second reference picture.

The objects, features and advantages of the present invention include providing a method and/or apparatus that may (i) determine a second picture for temporal direct-mode block prediction and/or (ii) map a reference index to a lowest valued reference index in a current reference list.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
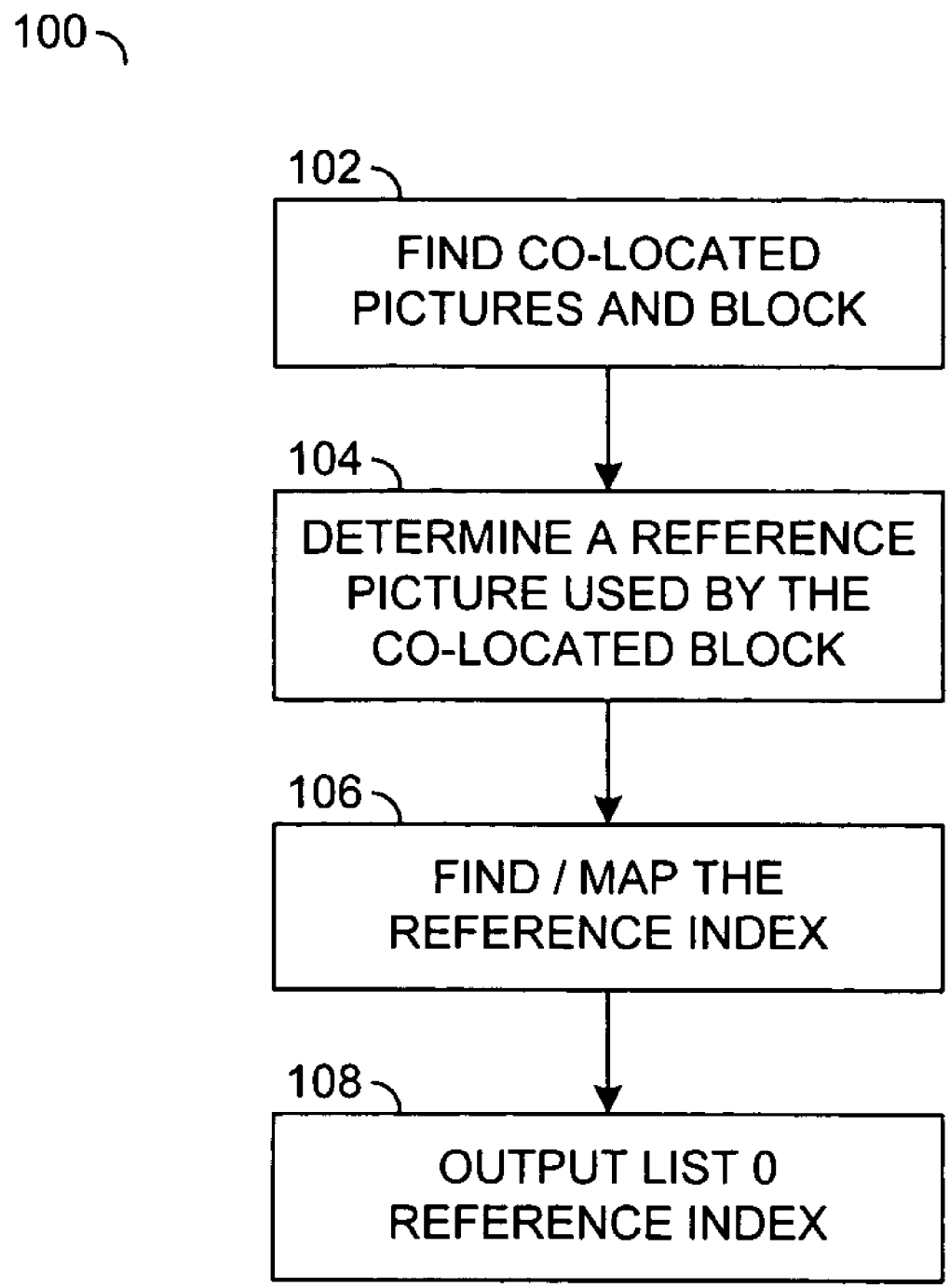
FIG. 1 is a flow diagram of an implementation of the present invention.

Referring to FIG. 1, a flow diagram 100 of the present invention is shown. The present invention may determine which two current reference pictures should be used for inter-prediction of each block of an H.264 direct-mode macroblock. The flow diagram 100 generally comprises a state 102, a state 104, a state 106 and a state 108.

The state 102 finds the co-located (e.g., reference 0, a first reference picture from List1) picture and block for the current block being processed. The co-located picture will be the first reference picture used for direct-mode prediction. The state 104 determines the reference picture that was used by the co-located block to refer to a 'direct-mode reference' (i) in reference List0 of the co-located slice (if a reference picture from List0 was used for inter-prediction of the co-located macroblock), or (ii) if no List0 reference picture was used, reference List1 of the co-located slice (if a reference picture from List1 was used for inter prediction of the co-located macroblock). The state 106 maps the reference picture from the state 104 to the lowest valued reference index in the current reference List0. The state 106 references the same reference picture that was referenced by the co-located picture in the state 104. The state 108 provides the List0 reference index found in the state 106 (e.g., the reference index is normally generated in response to remapping). The reference index is generally used with the reference list0 of the current slice to determine the second reference picture to be used for inter-prediction.

The state 106 searches the current List0 to determine the lowest valued reference index referring to the same reference picture that was referred by the co-located picture. The step 106 implements a number of operations and data not outlined in the current H.264 specification.

First, a unique identifier for each reference picture is stored. The unique identifier is normally correctly associated from the unique identifier that was used as an inter-reference in the co-located picture. The unique identifier is made available as a potential List0 inter-reference for the current picture. Next, a unique identifier to the actual 'direct-mode reference picture' is stored. Next, a module (or method) searches the current reference List0 for the lowest valued reference index identified by the unique identifier and return the value of that reference index.

A search in the current reference List0 provides the potential for increasing coding efficiency of B-frames and provides flexibility to the encoder to be able to use a truly interpolative direct-mode prediction along with an arbitrary choice for the picture referred by the first reference index (index0) of List0. These two options were mutually exclusive in the previous H.264 implementations discussed in the background section.

Figure 2:
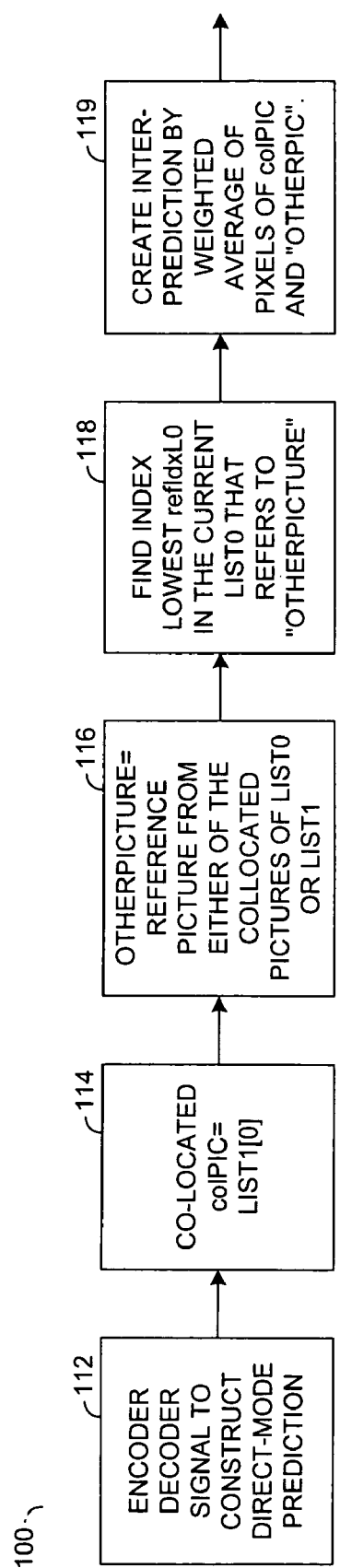
FIG. 2 is a diagram illustrating an implementation of the present invention.

Referring to FIG. 2, a diagram 100' is shown in accordance with the present invention. The flow diagram 100' generally comprises a block (or circuit) 112, a block (or circuit) 114, a block (or circuit) 116, a block (or circuit) 118 and a block (or circuit) 119. The block 112 is shown implementing an encoder/decoder signal to construct direct-mode prediction. The block 114 generally sets a co-located picture (e.g., COLPIC) as equal to a value in the List1 [0] (e.g., List1 at index 0). The block 116 generally determines whether the second picture is a picture from either List0 or a List1. The block 118 finds the index in the current List0 that refers to "other picture". The state 119 creates an interprediction by the weighted average of pixels of COLPIC and OTHERPIC.

The present invention may be particularly useful under circumstances when accurate direct-mode prediction is useful. Having a low-overhead/efficient reference to a reference frame other than the two pictures that yield the interpolative direct-mode prediction is desirable. For example, the first entry in List1 of the current B-picture is generally chosen to give a good direct-mode prediction. Higher compression may be achieved by using a picture other than the index 0 entry in List0 of the co-located picture as the index 0 entry in List0 of the current picture.

Another feature of the present invention is the choice of the order of pictures in the reference lists of the current picture being decoupled and independent from the choice of the order of reference pictures in the co-located picture. Decoupling the reference pictures potentially significantly simplifies the design of an encoder incorporating the present invention. For example, the lists of the co-located picture need not be taken into account when designing the lists for the current picture.

A unique reference index is normally found for the second reference picture for direct-mode predicted blocks. The lowest valued index in List0 is specifically chosen to use the same physical reference frame. The encoder is not unnecessarily constrained to refer to the same physical frame with the same index in List0 of the current picture as was used for the 'direct-mode reference' of the co-located picture. A meaningful and useful direct-mode prediction that effectively finds the current frame as a temporally interpolated intermediate estimate between the co-located picture and a corresponding 'direct-mode L0 reference'. For example, the index 0 of List0 may be chosen to maximize the coding efficiency of the reference indices rather than to make sure that a good direct-mode prediction is available.

The reference index prediction and context-based coding (e.g., with CABAC entropy-coding) may be improved by using the LOWEST possible reference index. Reference indices will often be ordered from most-frequent to least-frequent in expected occurrence frequency. The predicted index entropy should be expected to be reduced with the present invention.

The present invention may be implemented in all H.264 compliant decoders. While encoding may be implemented using the techniques described in the background section, the efficiency of such a system is generally reduced when compared with the present invention. Advanced encoders may realize a benefit by exploiting the improved flexibility possible with the use of the present invention.

A content-addressable-memory (CAM) may provide an efficient hardware structure for implementing the present invention. The present invention may also be implemented in software with a 'for' loop search beginning at index 0 of List0 and proceeding towards the end of List0. Such a software implementation may exit early from the loop when the desired reference frame is found. In other implementations, the present invention may be implemented with a variable that holds the lowest reference index in the current List0 that refers to the 'direct-mode L0 reference picture'. Such a variable would be set once before the decoding of the temporal direct-mode macroblocks of each new slice (e.g., if temporal direct rather than spatial direct is used for the slice) using the software table search 'for' loop method mentioned above.

Figure 3:
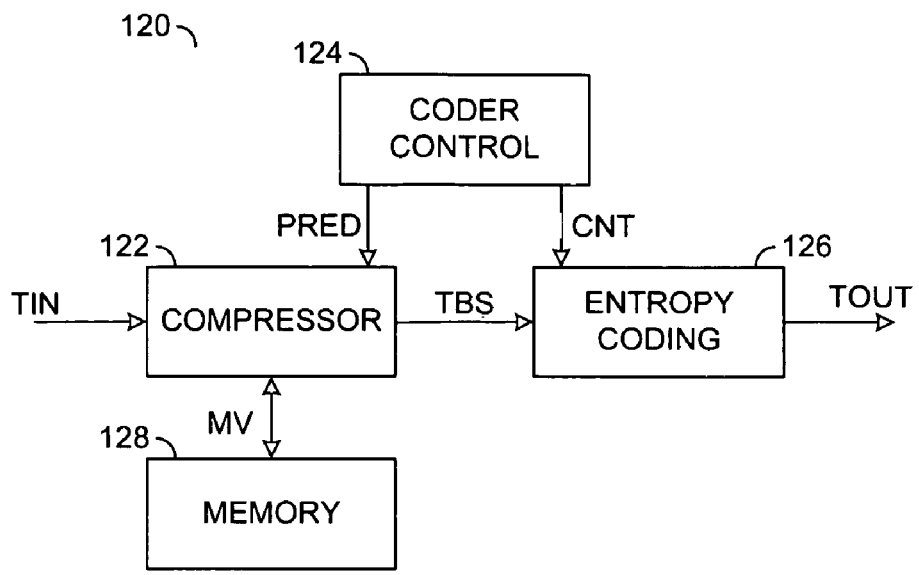
FIG. 3 is a partial block diagram of an example implementation of an encoder apparatus.

Referring to FIG. 3, a partial block diagram of an example implementation of an encoder apparatus 120 is shown. The encoder apparatus 120 may be implemented as a video bitstream encoder apparatus or system. The encoder apparatus 120 generally comprises a circuit 122, a circuit 124, a circuit 126 and a memory 128. The circuit 122 may receive a bitstream or signal (e.g., TIN). A bitstream or signal (e.g., TOUT) may be generated by the circuit 126. The memory 128 may hold the List0 and the List1 for each of the reference index values.

The circuit 122 may be implemented as a compression circuit or module. The compression circuit 122 may be operational to compress the blocks within the signal TIN thereby generating motion vectors. Compression may be determined by a signal (e.g., PRED) received from the circuit 124. A signal (e.g., MV) may exchange motion vectors between the compression circuit 122 and the memory 128. During compression, the motion vectors may be written to the memory 128. During reconstruction of a reference block the motion vectors may be read from the memory 128.

The circuit 124 may be implemented as a code control circuit. The circuit 124 may generate the signal PRED conveying the prediction type used by the macroblocks. The code control circuit 124 may also generate a signal (e.g., CNT). The signal CNT may provide coding controls to the circuit 126.

The circuit 126 may be implemented as a coding circuit. In one embodiment, the coding circuit 126 may be an entropy coding circuit. The entropy coding circuit 126 may receive the blocks and the associated groups of motion vectors from the compression circuit 122 via a bitstream or signal (e.g., TBS). The entropy coding circuit 126 may be configured to encode the signal TBS to generate the signal TOUT for transmission and/or storage. In one embodiment, the signal TOUT may be implemented as a Network Abstraction Layer defined by the H.264 standard.

The memory 128 may be implemented as an external memory. The memory 128 is generally operational to store the motion vectors for the blocks while the blocks are being encoded. The memory 128 may be configured to store other data used for encoding the bitstream data. Other types of memories may be implemented to meet the criteria of a particular application.

Figure 4:
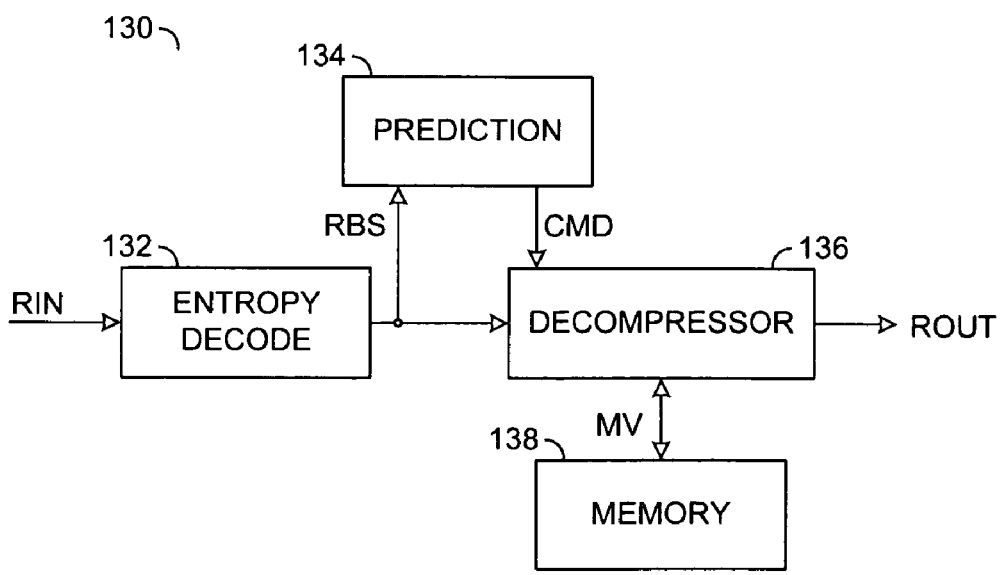
FIG. 4 is a partial block diagram of an example implementation of a decoder apparatus.

Referring to FIG. 4, a partial block diagram of an example implementation of a decoder apparatus 130 is shown. The decoder apparatus 130 may be implemented as a video bitstream decoder or system. The decoder apparatus 130 generally comprises a circuit 132, a circuit 134, a circuit 136 and a memory 138. The circuit 132 may receive an input bitstream or signal (e.g., RIN). The circuit 136 may generate an output bitstream or signal (e.g., ROUT).

The circuit 132 may be implemented as a decoder circuit. In one embodiment, the decoder circuit 132 may be implemented as an entropy decoder circuit 132. The entropy decoder circuit 132 may be operational to decode the bitstream signal TOUT generated by the entropy coding circuit 126 (e.g., TOUT=RIN). A decoded bitstream or signal (e.g., RBS) may be presented by the entropy decoder circuit 132 to the circuits 134 and 136.

The circuit 134 may be implemented as a prediction circuit. The prediction circuit 134 may be operational to determine if inter or intra prediction has been implemented for the various macroblocks of the pictures in the signal RBS. The prediction circuit 134 may generate a command signal (e.g., CMD) to the circuit 136 indicating the prediction type.

The circuit 136 may be implemented as a decompression circuit. The decompression circuit 136 may examine the compressed groups to determine how the motion vectors should be used. The decompression circuit 136 may store the motion vectors from decoded blocks that may be used for inferring motion vectors of co-located blocks the memory 128 via a signal (e.g., MV). The stored motion vectors may be read from the memory 138 to calculate the motion vectors for B-slice blocks coded under the direct mode (e.g., no associated motion vectors were transmitted in the signal TOUT) The direct mode generally refers to a macroblock or macroblock partition. The inferred motion vectors may then be used in generating the signal ROUT.

The memory 138 may be implemented as an external memory. The memory 138 is generally operational to store the motion vectors for the blocks for later use in calculating inferred motion vectors for the co-located blocks. The memory 138 may be configured to store other data used for decoding the bitstream data. Other types of memories may be implemented to meet the criteria of a particular application. The memory 138 may hold the List0 and the List1 for each of the reference index values.

The present invention may be implemented in decoders of the professional version (PExt) of the H.264 standard that use B-frames, and also for other future extensions of the H.264 standard.

While the invention has been particularly shown and described with reference to the preferred embodiments thereof, it will be understood by those skilled in the art that various changes in form and details may be made without departing from the spirit and scope of the invention.

The invention claimed is:

1. A method for determining a first and a second reference picture of a current block, comprising the steps of:
   (A) finding in a first list a co-located picture having a co-located block;
   (B) determining in a second list an inter-reference picture of said co-located block, wherein a unique identifier is associated with said inter-reference picture;
   (C) mapping in a third list a reference index to a lowest valued reference index associated with said unique identifier, wherein said unique identifier is associated with said inter-reference picture from (i) when said unique identifier is used with said inter-reference picture in said second list for said co-located picture to (ii) when said unique identifier is used with said inter-reference picture made available as a potential reference picture in said third list for said current block; and
   (D) using (i) said reference index to determine said second reference picture and (ii) said co-located picture as said first reference picture, wherein said first and said second reference pictures are used for inter-prediction of said current block.

2. The method according to claim 1, wherein said block comprises an H.264 direct-mode macroblock or macroblock partition.

3. The method according to claim 1, wherein step (C) further comprises:
   storing a respective unique identifier for each reference picture.

4. The method according to claim 1, further comprising the step of:
   storing said unique identifier of said inter-reference picture.

5. The method according to claim 1, wherein said inter-prediction operates on (i) a macroblock when in a first configuration and (ii) a macroblock partition when in a second configuration.

6. The method according to claim 1, wherein step (C) further comprises:
   searching said third list for the lowest valued reference index identified by said unique identifier and returning the value of said lowest valued reference index.

7. The method according to claim 1, wherein said method further comprising the step of:
   implementing an interpolative direct mode prediction and a flexible choice for the picture referenced by a finite index reference.

8. The method according to claim 1, wherein said method is implemented in a video encoder.

9. The method according to claim 1, wherein said method is implemented in a video decoder.

10. An apparatus for determining a first and a second reference picture of a current block, comprising the steps of:
> means for finding in a first list a co-located picture having a co-located block;
> means for determining in a second list and inter-reference picture of said co-located block, wherein a unique identifier is associated with said inter-reference picture;
> means for mapping in a third list a reference index to a lowest valued reference index associated with said unique identifier, wherein said unique identifier is associated with said inter-reference picture from (i) when said unique identifier is used with said inter-reference picture in said second list for said co-located picture to (ii) when said unique identifier is used with said inter-reference picture made available as a potential reference picture in said third list for said current block; and
> means for using (i) said reference index to determine said second reference picture and (ii) said co-located picture as said first reference picture, wherein said first and said second reference pictures are used for inter-prediction of said current block.

11. The apparatus according to claim 10, wherein said block comprises an H.264 direct-mode macroblock or macroblock partition.

12. The apparatus according to claim 10, wherein said means for mapping comprises:
> means for storing a respective unique identifier for each reference picture.

13. The apparatus according to claim 10, further comprising:
> means for storing said unique identifier of said inter-reference picture.

14. The apparatus according to claim 10, wherein said inter-prediction operates on (i) a macroblock when in a first configuration and (ii) a macroblock partition when in a second configuration.

15. The apparatus according to claim 10, wherein said means for mapping further comprises:
> means for searching said third list for the lowest valued reference index identified by said unique identifier and returning the value of said lowest valued reference index.

16. The apparatus according to claim 10, wherein said apparatus further comprises:
> means for implementing an interpolative direct mode prediction and a flexible choice for the picture referenced by a finite index reference.

17. The apparatus according to claim 10, wherein said apparatus is implemented in a video encoder.

18. The apparatus according to claim 10, wherein said apparatus is implemented in a video decoder.

19. An apparatus comprising:
> a circuit configured to (i) find in a first list a co-located picture having a co-located block, (ii) determine in a second list an inter-reference picture of said co-located block, wherein a unique identifier is associated with said inter-reference picture, (iii) map in a third list a reference index to a lowest valued reference index associated with said unique identifier, wherein said unique identifier is associated with said inter-reference picture from (i) when said unique identifier is used with said inter-reference picture in said second list for said co-located picture to (ii) when said unique identifier is used with said inter-reference picture made available as a potential reference picture in said third list for a current block and (iv) using (a) said reference index to determine a second reference picture and (b) said co-located picture as a first reference picture, wherein said first and said second reference pictures are used for inter-prediction of said current block.

20. The apparatus according to claim 19, further comprising a memory configured to store a respective unique identifier for each reference picture.

* * * * *